United States Patent
Lang et al.

(10) Patent No.: US 11,873,449 B2
(45) Date of Patent: Jan. 16, 2024

(54) FLUORESCENT CHROMIC MATERIAL, PREPARATION METHOD AND USE THEREOF

(71) Applicant: SOOCHOW UNIVERSITY, Suzhou (CN)

(72) Inventors: Jianping Lang, Suzhou (CN); Chunyu Liu, Suzhou (CN); Liang Chen, Suzhou (CN); Chunyan Ni, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 778 days.

(21) Appl. No.: 16/981,239

(22) PCT Filed: Jan. 8, 2020

(86) PCT No.: PCT/CN2020/070787
§ 371 (c)(1),
(2) Date: Sep. 15, 2020

(87) PCT Pub. No.: WO2021/047132
PCT Pub. Date: Mar. 18, 2021

(65) Prior Publication Data
US 2021/0246366 A1    Aug. 12, 2021

(30) Foreign Application Priority Data
Sep. 9, 2019  (CN) .......................... 201910849680.7

(51) Int. Cl.
C09K 9/02       (2006.01)
C09K 11/06      (2006.01)
C07F 9/50       (2006.01)

(52) U.S. Cl.
CPC ................ *C09K 9/02* (2013.01); *C07F 9/505* (2013.01); *C07F 9/5022* (2013.01); *C09K 11/06* (2013.01); *C09K 2211/1022* (2013.01)

(58) Field of Classification Search
CPC .. C09K 9/02; C09K 11/06; C09K 2211/1022; C07F 9/505; C07F 9/5022
See application file for complete search history.

(56) References Cited

FOREIGN PATENT DOCUMENTS

| CN | 101787041 A | 7/2010 |
|---|---|---|
| CN | 102071011 A | 5/2011 |

(Continued)

OTHER PUBLICATIONS

Alexander V. Artem'ev et al. "Alkyl-dependent self-assembly of the first red-emitting zwitterionic {Cu4I6} clusters from [alkyl-P(2-Py)3]+ salts and CuI: when size matters" Dalton Transactions, vol. 7, No. 48, pp. 2328-2337 (Feb. 21, 2019).

(Continued)

*Primary Examiner* — Bijan Ahvazi
(74) *Attorney, Agent, or Firm* — SZDC Law PC

(57) ABSTRACT

The present invention discloses a fluorescent chromic material having a chemical formula of $[PPy_3Cu_2I_2]_n$, wherein $PPy_3$ is tripyridylphosphine. The present invention also provides a method for preparing the fluorescent chromic material, and the use of the fluorescent chromic material in the detection of dichloromethane vapor. The fluorescent chromic material of the present invention has simple synthesis steps, high yield, and capability of large production; and can be used as a fluorescent probe for detecting dichloromethane vapor. It has the advantages of simple operation, high selectivity, high sensitivity, good cycle performance and good stability.

6 Claims, 6 Drawing Sheets

(56) References Cited

FOREIGN PATENT DOCUMENTS

| | | | |
|---|---|---|---|
| CN | 102372748 | A | 3/2012 |
| CN | 104961770 | A | 10/2015 |
| CN | 106867503 | A | 6/2017 |
| CN | 110511743 | A | 11/2019 |
| DE | 102014116314 | A1 | 5/2016 |

OTHER PUBLICATIONS

Chen Qiao, "Synthesis & Characterization of Pyridyl Phosphine Copper (I) Halide Complexed and Polyoxmetalates-based Hybrid Derivatives" Master Thesis, Hubei University (May 15, 2018).

Atsushi Kobayashi et al. "Environmentally Friendly Mechanochemical Syntheses and Conversions of Highly Luminescent Cu(I) Dinuclear Complexes" Inorganic Chemistry, vol. 55, pp. 1978-1985 (Feb. 11, 2016).

FLUORESCENT CHROMIC MATERIAL, PREPARATION METHOD AND USE THEREOF

This application is the National Stage Application of PCT/CN2020/070787, filed on Jan. 8, 2020, which claims priority to Chinese Patent Application No. 201910849680.7, filed on Sep. 9, 2019, which is incorporated by reference for all purposes as if fully set forth herein.

FIELD OF THE INVENTION

The present invention relates to the technical field of fluorescent materials, and more particularly to a fluorescent chromic material, and a preparation method and use thereof.

DESCRIPTION OF THE RELATED ART

In recent years, the detection of small organic molecules has attracted more and more attention. Among them, chlorinated alkanes, such as dichloromethane, chloroform and other solvents are toxic gases with strong volatility and flammability. They are lipophilic and hydrophobic, difficult to degrade, environmentally persistent, and difficult to metabolize, and tend to accumulate along the food chain, thus seriously endangering human health and the ecological environment. Because of its good solubility, dichloromethane is widely used, and dichloromethane has low boiling point, and is likely to be volatilized into the air, causing a huge impact on human health and environmental pollution. Therefore, miniaturized, low-cost, safe and reliable devices for identifying and detecting organic solvents have a great commercial application value (see: E. X. Chen, H. Yang, J. Zhang, Inorg. Chem., 2014, 53, 5411-5413.).

Among the numerous detection methods, the electrochemical detection of small organic molecules is intensively studied. Electrochemical detection has the advantages of wide scope of detection and good cycle performance. However, electrochemical detection requires additional devices and higher detection temperature, and has poor long-term stability, which greatly limits the practical application of electrochemical detection. (See: Z. H. Weng, J. J. Qin, A. A. Umar, J. Wang, X. Zhang, H. L. Wang, X. L. Cui, X. G. Li, L. R. Zheng, Y. Q. Zhan, Adv. Funct. Mater., 2019, 29, 1902234). Moreover, the rapid development of MOFs for fluorescence detection of small organic molecules has become the focus of research for many scientists. Compared with the electrochemical detection methods, MOFs have the advantages of diverse structures, simple operations of fluorescence detection, and visualization of results, making them a particularly practical and flexible method for the detection of small organic molecules. However, in the past few years, more studies are directed to the fluorescence detection of small organic molecules in solution, and the research reports on gas-phase fluorescence detection are very limited. This is mainly due to the extremely high sensitivity and fast response required by gas-phase fluorescence detection (see: Y. Li, S. S. Zhang, D. T. Song, Angew. Chem. Int. Ed., 2013, 52, 710-713).

Porous MOFs are highly ordered crystalline porous materials formed by self-assembly of metal ions or metal clusters as nodes through the bridging of organic ligands. Compared with single-metal nodes, MOFs with multi-nuclear metal clusters as nodes allow more active sites to be exposed, making it possible for small molecules to enter and interact with the active sites, thus being assembled to form a porous structure sensitive to solvent molecules (See: R. W. Huang, Y. S. Wei, X. Y. Dong, X. H. Wu, C. X. Du, S. Q. Zang, T. C. W. Mak, Nat. Chem., 2017, 9, 689-697). Copper is non-toxic and tasteless, and is abundant in the earth's crust. Because of its excellent photoluminescence properties, copper-iodine clusters have shown great potential in sensing research (see: S. Z. Zhan, M. Li, J. Zheng, Q. J. Wang, S. W. Ng, D. Li, Inorg. Chem., 2017, 56, 13446-13455). Therefore, it is of great significance to construct porous coordination polymers with copper-iodine clusters as nodes, and to explore the fluorescence response of such complexes to the vapor of dichloromethane.

SUMMARY OF THE INVENTION

To overcome the above problems in the prior art, an object of the present invention is to provide a fluorescent chromic material, which has simple synthesis steps, high yield, and capability of large production; and can be used as a fluorescent probe for detecting dichloromethane vapor. It has the advantages of simple operation, high selectivity, high sensitivity, good cycle performance and good stability.

To achieve the above technical object and technical effects, the following technical solutions are adopted in the present invention.

In one aspect, the present invention provides a fluorescent chromic material having a chemical formula of $[PPy_3Cu_2I_2]_n$, wherein $PPy_3$ is tripyridylphosphine.

The fluorescent chromic material of the present invention is a cluster-based MOF material based on $[Cu_4I_4]$ units, which has a three-dimensional MOF structure constructed with $[Cu_4I_4]$ clusters as connecting nodes and tripyridylphosphine as a bridging ligand and has a molecular formula of $C_{15}H_{12}Cu_2I_2N_3P$.

Preferably, the fluorescent chromic material is a crystal having the following unit cell parameters: a=b=30.672 Å, c=11.631 Å, α=β=90°, γ=120°, and space group R-3.

In another aspect, the present invention also provides a method for preparing the fluorescent chromic material, comprising:
  adding cuprous iodide and tripyridylphosphine to mixed solution of acetonitrile and water, and reacting under heating; and filtering the resulting solution after the reaction is completed, to obtain a crystal that is the fluorescent chromic material.

Preferably, the molar ratio of cuprous iodide to tripyridinyl phosphine is 2:1-3:1, and the volume ratio of acetonitrile to water is 1:1 to 2:1.

Preferably, the heating temperature is 80-130° C., and the heating time is 24-48 h.

Preferably, after the filtration, the collected crystals are washed with ether, and then dried.

In still another aspect, the present invention also provides use of the fluorescent chromic material in the detection of dichloromethane vapor.

As compared with the prior art, the present invention has the following beneficial effects:
  1. The present invention discloses a cluster-based MOF material based on $[Cu_4I_4]$ units, which can be obtained through a simple synthesis process. The $[Cu_4I_4]$ cluster in the structure shows a rare knot-like structure, and the cluster-based MOF material shows a one-dimensional channel structure along the c-axis direction. The pyridine ring is hanged on the inner side of the channel, providing the possibility of interaction of small-molecule solvents therewith.
  2. The cluster-based MOF material based on $[Cu_4I_4]$ units disclosed in the present invention has a highly sensitive "Turn on" fluorescence response to dichloromethane vapor, and the fluorescence intensity is increased by about 15 times in the response state.

3. The cluster-based MOF material based on [Cu₄I₄] units of the present invention exhibit a very sensitive response speed in the experiment of fluorescence response to dichloromethane vapor, where the response time is less than 1 s, and the recovery time is about 45 s. Moreover, the fluorescent chromic material disclosed in the present invention has high stability. After 20 cycles, no obvious decrease is found in the reaction time and sensitivity, and the structure remains stable in the air for 6 months without significant collapse.

The above description is only a summary of the technical solutions of the present invention. To make the technical means of the present invention clearer and implementable in accordance with the disclosure of the specification, the preferred embodiments of the present invention will be described in detail with reference to the accompanying drawings. Specific embodiments of the present invention will be described in detail by way of examples with reference to the accompanied drawings.

BRIEF DESCRIPTION OF THE DRAWINGS

In order to more clearly explain the technical solutions in the embodiments of the present invention, the drawings used in the description of the embodiments will be briefly described below. Obviously, the drawings depicted below are merely embodiments of the present invention, and those skilled in the art can obtain other drawings based on these drawings without any creative efforts.

DETAILED DESCRIPTION OF THE PREFERRED EMBODIMENTS

The technical solutions in the embodiments of the present invention will be described clearly and fully with reference to the accompanied drawings in the embodiments of the present invention. Apparently, the embodiments described are merely some, rather than all of the embodiments of the present invention. All other embodiments obtained by a person of ordinary skill in the art without creative efforts based on the embodiments of the present invention shall fall within the protection scope of the present invention.

Example 1: Preparation of Cluster-Based MOF Material Based on [Cu₄I₄] Units

At room temperature, CuI (0.0382 g, 0.2 mmol) and tripyridylphosphine (0.0532 g, 0.1 mmol) at a molar ratio of 2:1 were added to a mixed solvent of acetonitrile and water (1:1, 2 mL). The mixed solution was subjected to a solvothermal reaction at a temperature of 80 to 130° C. for 24 to 48 h, to obtain orange-yellow bulky crystals. The crystals were collected by filtration, then washed thoroughly with ether, and finally dried in a vacuum oven at 30° C. 0.0829 g (Yield: 90.7%, calculated based on copper).

Figure 1:
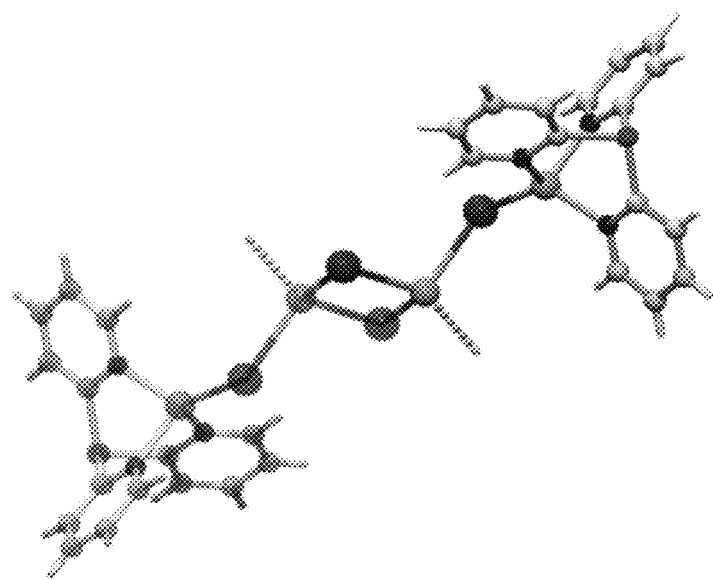
FIG. 1 is a diagram showing the structural unit [Cu₄I₄] in the compound [PPy₃Cu₂I₂]ₙ.
Figure 2:
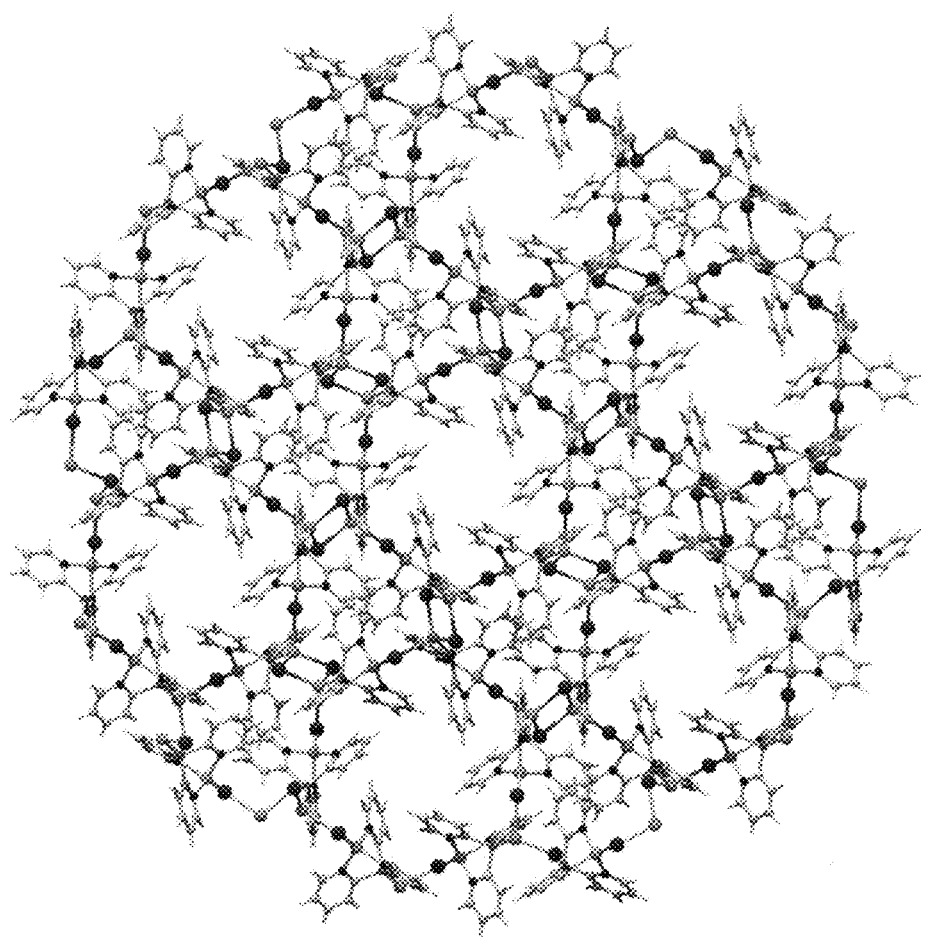
FIG. 2 is a three-dimensional structural diagram of [PPy₃Cu₂I₂]ₙ.

In the compound [PPy₃Cu₂I₂]ₙ, the mode of connection between the basic unit that is the connection node Cu₄I₄ and the bridging ligand PPy₃ is shown in FIG. 1. Cu₄I₄ shows a rare knot-like coordination structure. As a four-connection node, it is coordination bridged by PPy₃ in four directions, to connect to other four equivalent Cu₄I₄ structures, thereby continuously extending to form a cluster-based three-dimensional MOF structure. To better show the structure, the stacked structure is illustrated in detail in FIG. 4. The structure shows an extended one-dimensional channel along the c-axis, with a channel diameter of about 8 Å. Six pyridine rings are hanged on the inner wall of the channel, which provides the possibility for subsequent interaction of small molecules therewith.

Example 2: Characterization of Cluster-Based MOF Material Based on [Cu₄I₄]

The fluorescent chromic material was characterized by IR spectroscopy, elemental analysis and single crystal X-ray diffraction. The specific results are shown below.

Elemental analysis (%): $C_{15}H_{12}Cu_2I_2N_3P$ (M.W.=646.13), calculated: C, 27.86; H, 1.85; N, 6.50%; found: C, 27.97; H, 2.03; N, 6.57%.

Infrared spectroscopy (potassium bromide pellet pressing method): 3440 (s), 1627 (m), 1593 (s), 1475 (s), 1436 (s), 1400 (m), 1218 (w), 1159 (w), 1098 (s), 1083 (s), 997 (m), 858 (s), 742 (m), 693 (m), 507 (m), 481 (w) cm$^{-1}$.

The above data shows that a cluster-based MOF material based on [Cu₄I₄], that is [PPy₃Cu₂I₂]ₙ is successfully obtained in this example.

TABLE 1

Selected crystal data and structural refinement parameters of the compound [PPy₃Cu₂I₂]ₙ

| Compound | [PPy₃Cu₂I₂]ₙ |
|---|---|
| Molecular formula | $C_{15}H_{12}Cu_2I_2N_3P$ |
| Molecular weight | 646.130 |
| Crystal system | Trigonal system |
| Space group | R-3 |
| a/Å | 30.672 (10) |
| b/Å | 30.672 (10) |
| c/Å | 11.631 (4) |
| α/° | 90.000 |
| β/° | 90.000 |
| γ/° | 120.000 |
| V/Å³ | 9476.1 (70) |
| $D_c$/g cm$^{-3}$ | 2.038 |
| Z | 18 |
| μ (Mo-Kα)/mm$^{-1}$ | 5.028 |
| Total number of reflections | 5244 |

TABLE 1-continued

Selected crystal data and structural refinement
parameters of the compound $[PPy_3Cu_2I_2]_n$

| | |
|---|---|
| Number of independent reflections | 3278 |
| F (000) | 5436 |
| $R_1{}^a$ | 0.0649 |
| $wR_2{}^b$ | 0.1606 |
| $GOF^c$ | 1.073 |

Figure 3:
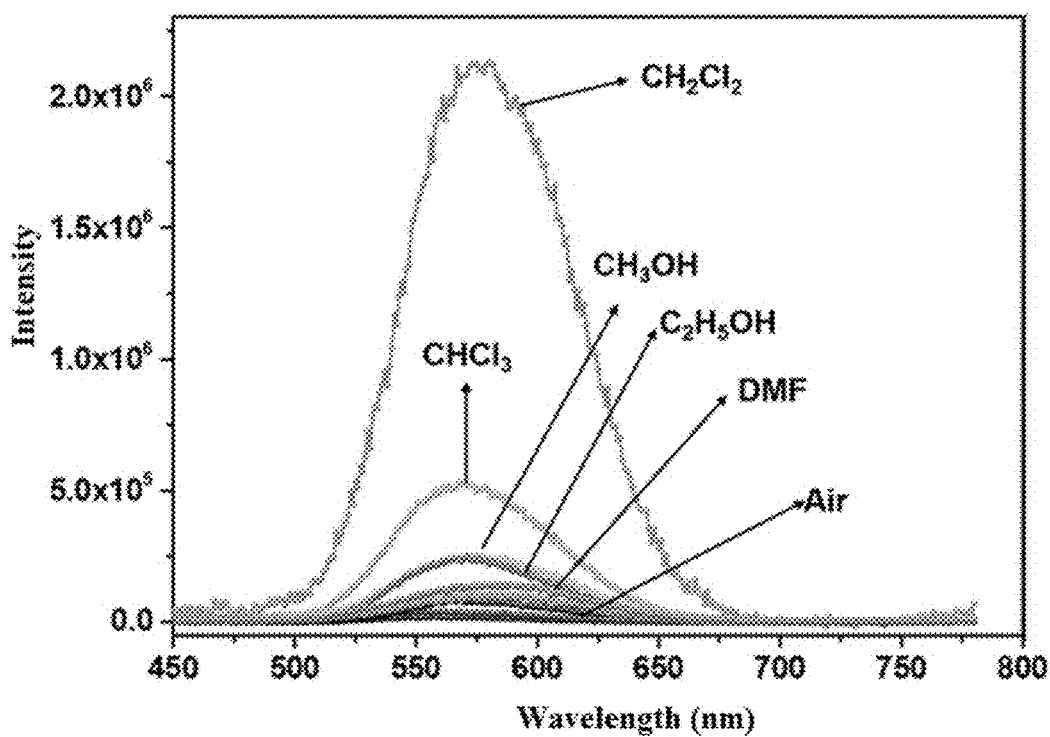
FIG. 3 is a diagram showing fluorescence emission of the compound [PPy₃Cu₂I₂]ₙ in response to various solvent vapors.
Figure 4:
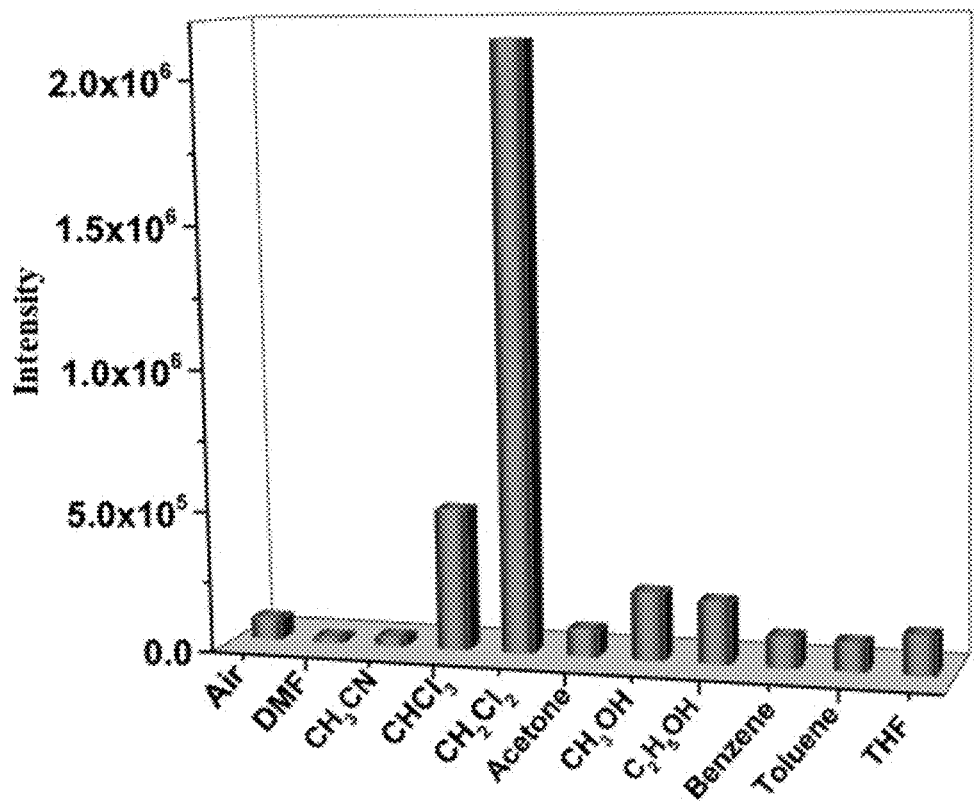
FIG. 4 is a histogram of the fluorescence intensity at 580 nm of the compound [PPy₃Cu₂I₂]ₙ in various solvent vapors.
Figure 5:
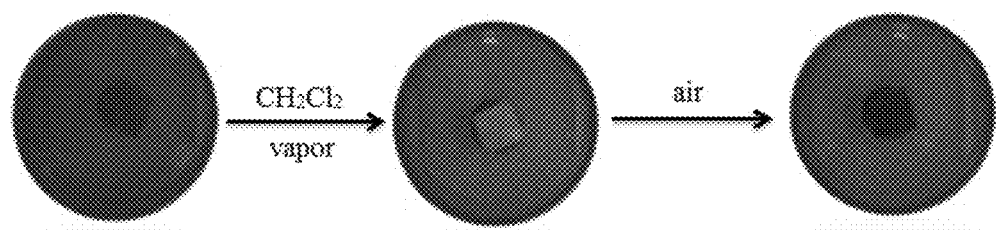
FIG. 5 shows the change in color of the compound [PPy₃Cu₂I₂]ₙ in response to dichloromethane vapor.

Example 3: Test for Selectivity of the Fluorescence Response of Cluster-Based MOF Material Based on $[Cu_4I_4]$ Units to Various Solvent Vapors The compound $[PPy_3Cu_2I_2]_n$ was placed respectively in cuvettes containing different solvent vapors, and the fluorescence response was tested after 30 min. The results are shown in FIG. 3. The compound shows a significantly enhanced fluorescence response to dichloromethane and chloroform, and shows a 15-fold increase in the fluorescence response to dichloromethane vapor. FIG. 4 shows that the compound has a better selectivity for dichloromethane. FIG. 5 shows the color change of the compound in dichloromethane vapor.

Figure 6:
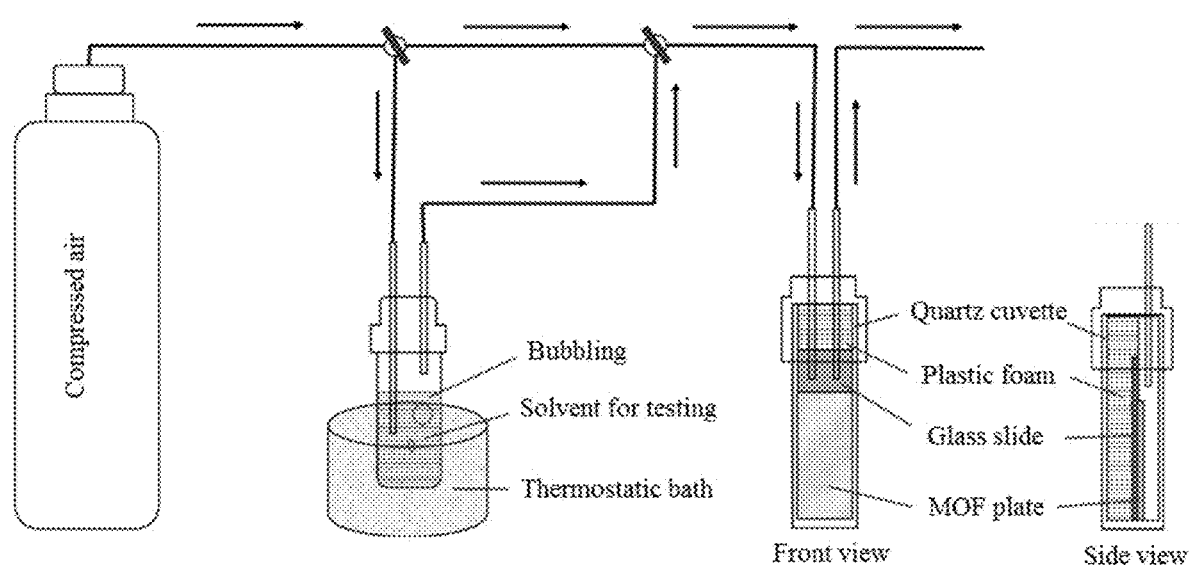
FIG. 6 shows a device showing the response of the compound [PPy₃Cu₂I₂]ₙ to dichloromethane vapor.
Figure 7:
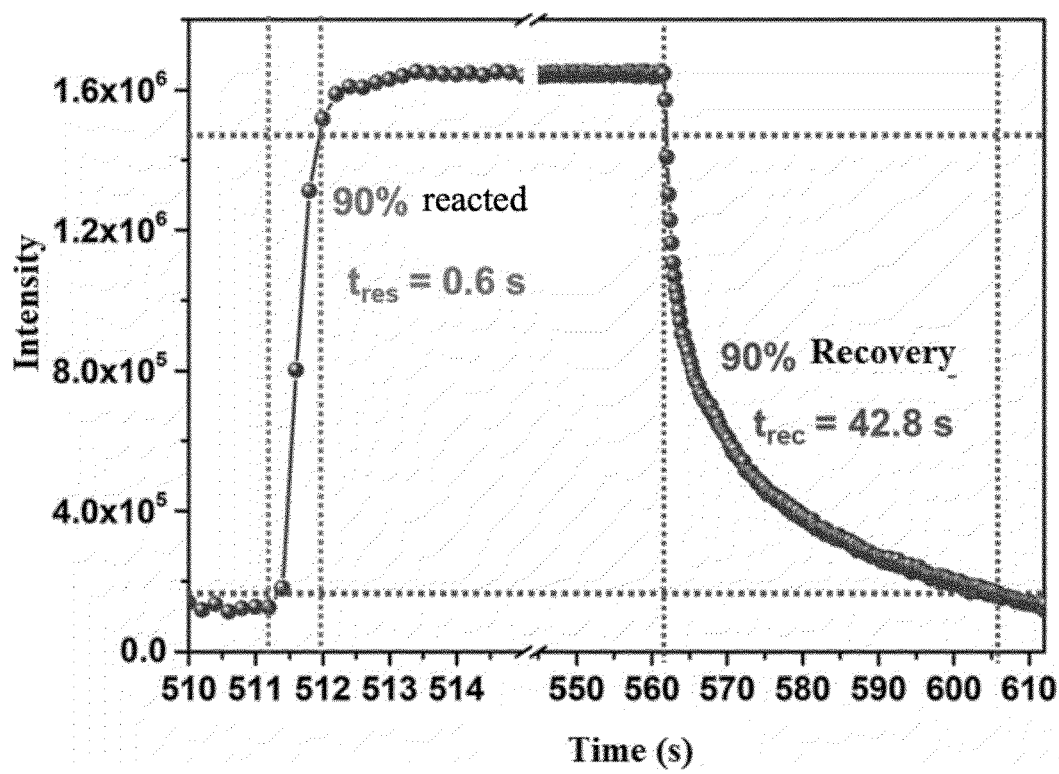
FIG. 7 is a diagram showing the reaction time and recovery time of the compound [PPy₃Cu₂I₂]ₙ in response to dichloromethane vapor.

Example 4: Test for Response Sensitivity $[PPy_3Cu_2I_2]_n$ in the present invention was used as a fluorescent chromic material to detect its response sensitivity to dichloromethane vapor. Specific steps were shown in FIG. 6. The compound was made into a film and placed in a cuvette. Subsequently, a three-way valve was used to adjust the gas introduced into the cuvette, which is air or gas passing through the dichloromethane solvent and containing dichloromethane vapor, and the fluorescence intensity at 580 nm was tested. The results are shown in FIG. 7. The compound shows a fast and sensitive response to the dichloromethane vapor, where the response time is only no more than 1 s, and the recovery time is only about 45 s. It can be seen that the compound shows a better sensitivity in the detection of dichloromethane vapor.

Example 5: Cycle Test

Figure 8:
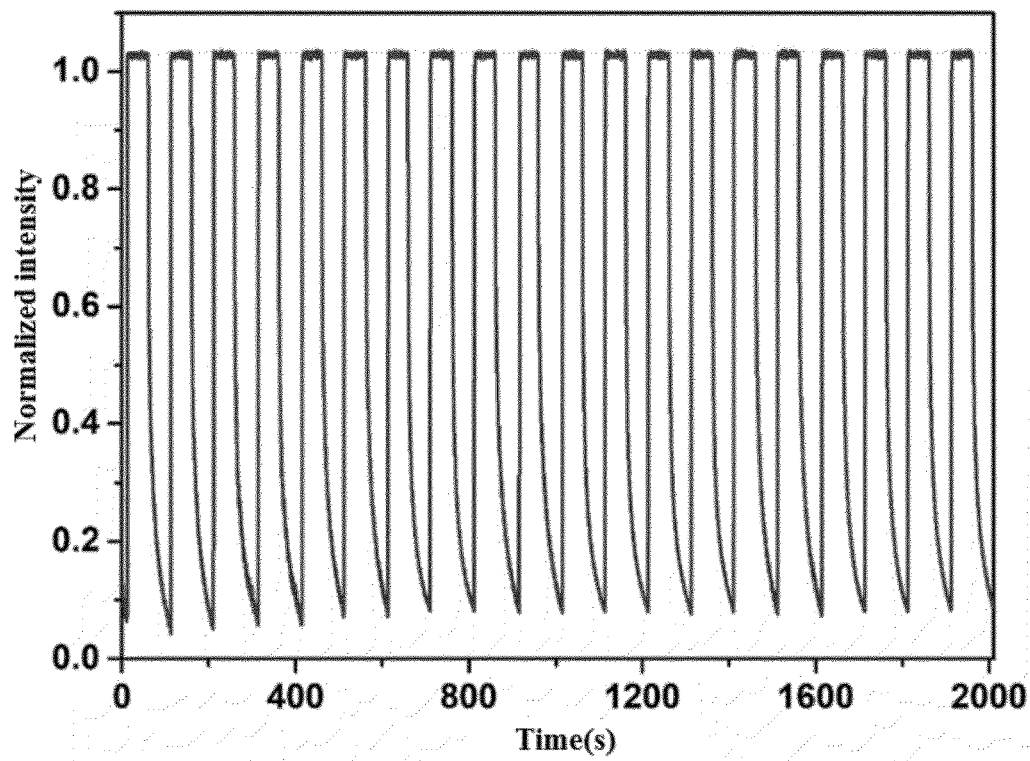
FIG. 8 shows the response of the compound [PPy₃Cu₂I₂]ₙ to dichloromethane vapor in 20 cycles.
Figure 9:
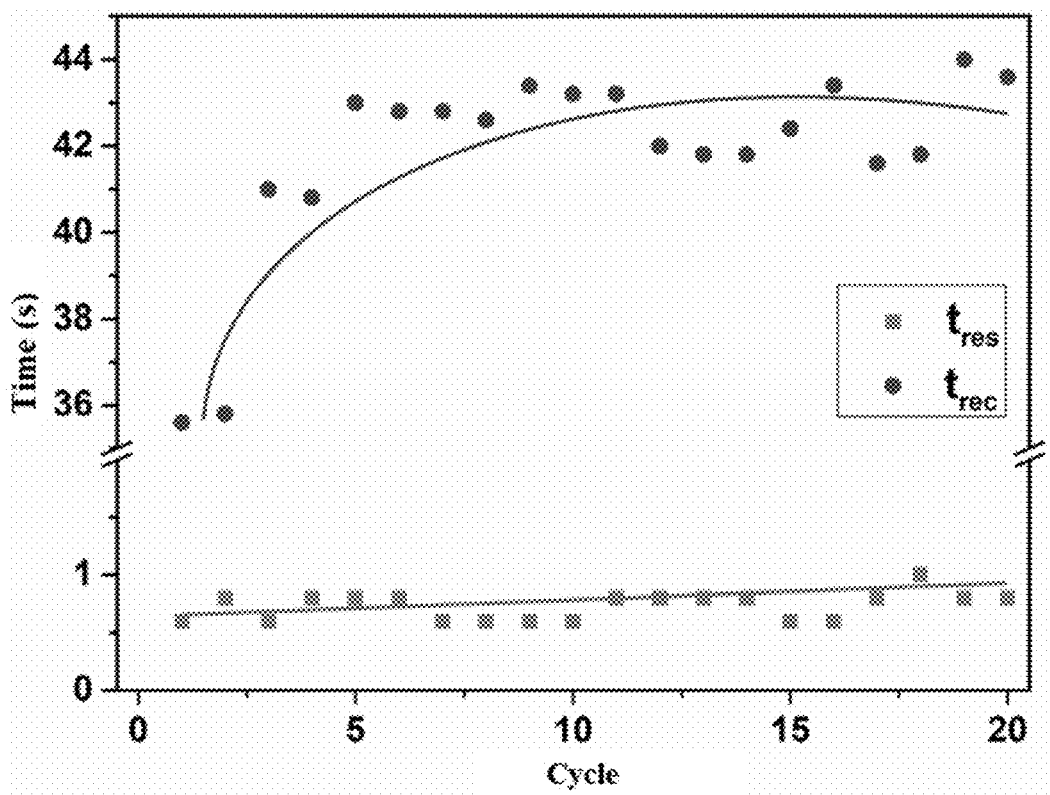
FIG. 9 is a statistical graph of the reaction time and recovery time of the compound [PPy₃Cu₂I₂]ₙ in response to dichloromethane vapor in 20 cycles.

To test the cycle performance of the compound in the fluorescence detection of dichloromethane vapor, the related investigations were performed. The air and air with dichloromethane vapor were manually controlled to enter the cuvette by using the instrument shown in FIG. 6 to test the cycle performance, and the time interval between the two gases was 50 seconds. The test results are shown in FIG. 8. The compound shows an excellent cycle performance in response to dichloromethane vapor. After 20 rounds of cycle test, it still retains a high sensitivity, and the fluorescence intensity has no significant change before and after the response to dichloromethane vapor.

Example 6: Stability Test

Figure 10:
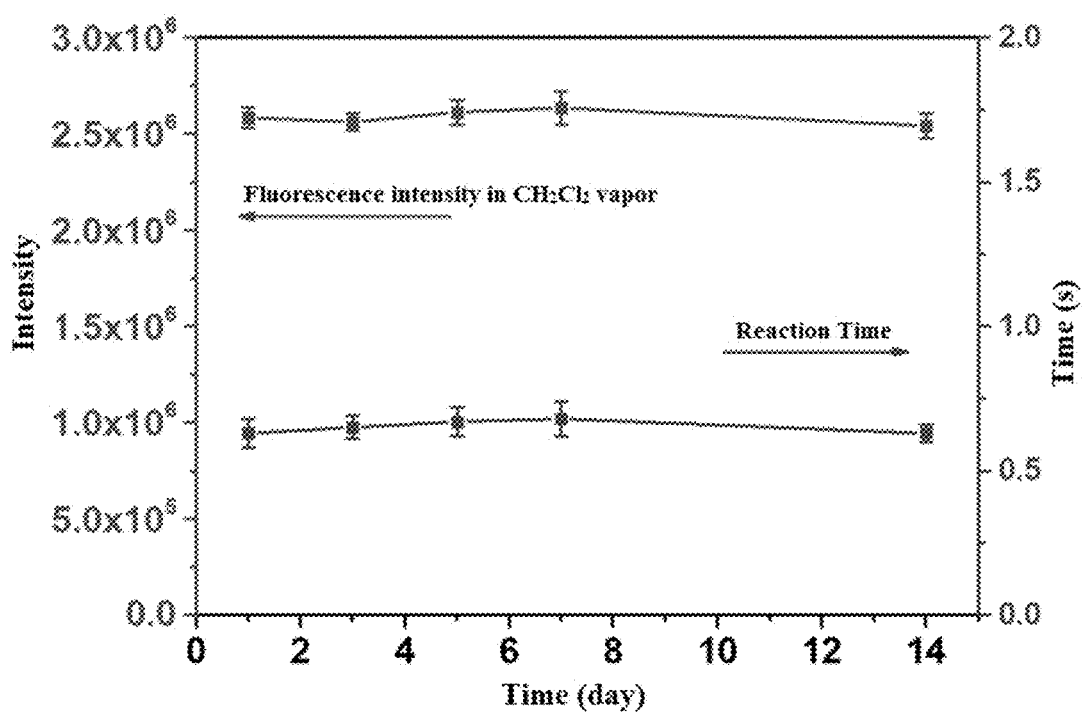
FIG. 10 is a statistical graph showing the sensitivity and relative intensity of the compound [PPy₃Cu₂I₂]ₙ in response to dichloromethane vapor in a 14-day period.
Figure 11:
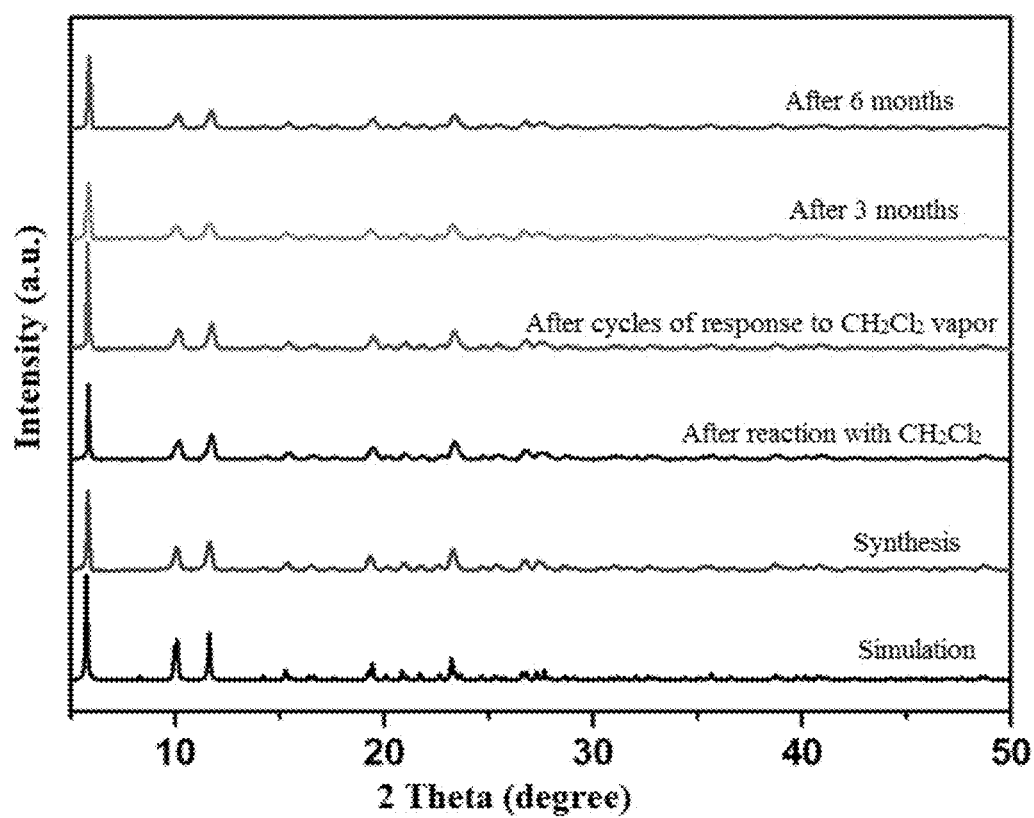
FIG. 11 shows the PXRD patterns of the compound [PPy₃Cu₂I₂]ₙ under different conditions.

The compound was placed in air for a period of time to test its fluorescence response to dichloromethane vapor. As shown in FIG. 10, if the time is extended to two weeks, the response speed and response intensity to dichloromethane vapor are not significantly decreased. After the sample was placed in air for 6 months, its PXRD patterns (FIG. 11) show that its structure remains stable, proving that this compound has good stability.

The above description of the disclosed embodiments enables those skilled in the art to implement or use the present invention. Various modifications to these embodiments will be obvious to those skilled in the art, and the general principles defined herein can be implemented in other embodiments without departing from the spirit or scope of the present invention. Therefore, the present invention is not limited to the embodiments shown herein, but falls within the widest scope consistent with the principles and novel features disclosed herein.

What is claimed is:

1. A fluorescent chromic material, having a chemical formula of $[PPy_3Cu_2I_2]_n$, wherein $PPy_3$ is tripyridylphosphine, and wherein the fluorescent chromic material is a crystal having the following unit cell parameters: a=b=30.672 Å, c=11.631 Å, α=β=90°, γ=120°, and space group R-3.

2. A method for preparing the fluorescent chromic material according to claim 1, comprising steps of:
 adding cuprous iodide and tripyridylphosphine to a mixed solution of acetonitrile and water, and reacting by heating; and filtering the resulting solution after the reaction is completed, to obtain crystals that are the fluorescent chromic material.

3. The method for preparing a fluorescent chromic material according to claim 2, wherein the molar ratio of cuprous iodide to tripyridinyl phosphine is 2:1-3:1, and the volume ratio of acetonitrile to water is 1:1-2:1.

4. The method for preparing a fluorescent chromic material according to claim 2, wherein the heating temperature is 80-130° C., and the heating time is 24-48 h.

5. The method for preparing a fluorescent chromic material according to claim 2, wherein after filtration the crystals are washed with ether, and dried.

6. A method for the detection of dichloromethane vapor:
 providing the fluorescent chromic material according to claim 1; and
 detecting the dichloromethane vapor by using the fluorescent chromic material.

\* \* \* \* \*